United States Patent [19]

Takayanagi

[11] Patent Number: 5,690,859
[45] Date of Patent: Nov. 25, 1997

US005690859A

[54] LIQUID CRYSTAL POLYMER COMPOSITION

[76] Inventor: Motoo Takayanagi, 20-20, Tani 2-chome, Chuo-ku, Fukuoka-shi, Fukuoka, Japan

[21] Appl. No.: 603,353

[22] Filed: Feb. 20, 1996

Related U.S. Application Data

[63] Continuation of Ser. No. 369,912, Jan. 6, 1995, abandoned.

[30] Foreign Application Priority Data

| Jan. 10, 1994 | [JP] | Japan | 6-000968 |
| Feb. 21, 1994 | [JP] | Japan | 6-022369 |
| Nov. 15, 1994 | [JP] | Japan | 6-280448 |

[51] Int. Cl.[6] ............................ C09K 19/20; C09K 19/52
[52] U.S. Cl. ...................... 252/299.67; 252/299.01; 252/299.66
[58] Field of Search ............ 252/299.01, 299.67, 252/299.66, 299.68; 428/1

[56] References Cited

U.S. PATENT DOCUMENTS

| 5,134,194 | 7/1992 | Inoue et al. | 525/64 |
| 5,236,988 | 8/1993 | Doyama et al. | 524/404 |
| 5,310,776 | 5/1994 | Takagi et al. | 525/66 |
| 5,360,647 | 11/1994 | Sumida | 428/1 |

FOREIGN PATENT DOCUMENTS

| 47-47870 | 12/1972 | Japan. |
| 56-18016 | 4/1981 | Japan. |
| 57-40550 | 3/1982 | Japan. |
| 63-3888 | 1/1988 | Japan. |
| 2-289645 | 11/1990 | Japan. |
| 3-54250 | 3/1991 | Japan. |

*Primary Examiner*—Shean C. Wu
*Attorney, Agent, or Firm*—Birch, Stewart, Kolasch & Birch, LLP

[57] ABSTRACT

A liquid-crystal polymer composition which comprises (A) a wholly aromatic liquid-crystal polymer, (B) a semi-aromatic liquid-crystal polymer and (C) a thermoplastic resin other than liquid-crystal polymers. It exhibits mechanical properties better than those of a liquid-crystal polymer composition which comprises the components (A) and (C) or the components (B) and (C) and is equal to the above composition in the proportion of the component (C). Further, the present invention enables the preparation of a polymer composition exhibiting liquid-crystal functions at a relatively low cost, thus giving a material useful as an engineering plastic.

6 Claims, 7 Drawing Sheets

LIQUID CRYSTAL POLYMER COMPOSITION

This application is a continuation of application Ser. No. 08/369,912, filed on Jan. 6, 1995, now abandoned.

BACKGROUND OF THE INVENTION

1. Field of the Invention

The present invention relates to a liquid-crystal polymer composition which exhibits excellent mechanical properties and is relatively inexpensive.

2. Description of the Related Art

A liquid-crystal polymer does not undergo the entangling of molecules even in a molten state by virtue of the high rigidity of the molecule, i.e., it forms polydomains having a nematic liquid-crystallinity in a molten state to exhibit a behavior by which the molecular chains are remarkably oriented in the direction of flow under a low shear stress. Therefore, a liquid-crystal polymer is generally also called "melt liquid-crystal type (thermotropic liquid-crystal type) polymer". Because of to this specific behavior, a liquid-crystal polymer has excellent melt flowability and has a heat deformation temperature of as high as 300° C. or above when it takes a specific molecular structure. As a result, liquid crystal polymers can be widely used as a material in the fields necessitating high heat resistance and excellent flowability in forming a thin-walled article. However, liquid-crystal polymers are generally more expensive than ordinary thermoplastic resins, and therefore could not be used in some fields because of limitation on the cost, even though their performance was satisfactory in these fields.

In order to reduce the cost of a liquid-crystal polymer, it is possible to blend a liquid-crystal polymer with a thermoplastic resin, and many studies have been made on such blends. However, many of the blends exhibited properties which were, at most, those expected from the constituents according to the additivity rule of modulus and strength based on volume fraction. This created problems in practical use. For example, JP-A 3-45107(1991) discloses a blend of a thermoplastic resin with a polymer forming an anisotropic melt. Although this patent describes that the blend serves to lower the melt viscosity of the thermoplastic resin and thus enhance the degree of freedom in processing, it is silent on the influence of the blend on the mechanical properties.

With respect to blending of liquid-crystal polymers with each other, for example, JP-A 57-40550(1982) and JP-A 2-289645(1990) each discloses a composition comprising two liquid-crystal polymers of specific structures. However, these patent documents are silent about the addition of a thermoplastic resin to the compositions or the influence of the resin on the characteristics of the compositions.

Although JP-A 3-54250(1991) discloses that a molten blend of a semi-aromatic liquid-crystal polymer with a wholly aromatic liquid-crystal polymer exhibits excellent heat resistance, it is silent on the improvement in the mechanical properties or the blending of a liquid-crystal polymer with a thermoplastic resin.

SUMMARY OF THE INVENTION

The present invention has the objective of overcoming the above problem to provide a liquid-crystal polymer composition which exhibits excellent mechanical properties and is relatively inexpensive.

The inventors of the present invention have made intensive studies to solve the above problem and as a result they have accomplished the present invention.

The present invention is directed to a liquid-crystal polymer composition which comprises (A) a wholly aromatic liquid-crystal polymer, (B) a semi-aromatic liquid-crystal polymer and (C) a thermoplastic resin other than liquid-crystal polymers.

It is preferable that the proportion of the component (A) is 0.1 to 90% by weight, that of the component (B) is 80 to 0.1% by weight, and that of the component (C) is the balance, each percentage being based on the whole liquid-crystal polymer composition. The wholly aromatic liquid-crystal polymer (A) is a polymer which does not contain any repeating aliphatic unit and is composed of units of at least one group selected from the group consisting of carbonyl, ester, sulfone, amide, ether, thio ether, imide and azo groups, and aromatic units; the semi-aromatic liquid-crystal polymer (B) is a polymer which contains units of at least one aliphatic group and the balance of which is composed of units of at least one group selected from the group consisting of carbonyl, ester, sulfone, amide, ether, thio ether, imide and azo groups, and aromatic units. A preferable composition comprises 1 to 90 percent by weight of (A) and 80 to 1 percent by weight of (B).

The present invention will now be described in detail.

The wholly aromatic liquid-crystal polymer to be used in the present invention is a polymer which does not contain any repeating aliphatic unit and is composed of units of at least one group selected from the group consisting of carbonyl, ester, sulfone, amide ether, thio ether, imide and azo groups, and aromatic units. A polymer composed of ester units and aromatic units is particularly preferable. Examples of the group constituting the aromatic units includes phenylene and diphenylene groups, at least divalent naphthalene groups, at least divalent anthracene groups, at least divalent cyclopentadienyl groups, at least divalent phenanthrene groups, at least divalent pyrene groups and at least divalent perylene groups.

The repeating structural units of the wholly aromatic liquid-crystal polymer include the following units, though they are not limited to these.

Repeating structural units represented by the following chemical formula 1 which are derived from aromatic hydroxy carboxylic acids:

Formula 1:

(X: halogen or alkyl)

(A₂)

Repeating structural units represented by the following chemical formula 2 which are derived from aromatic dicarboxylic acids:

Formula 2:

(B₁)

(B₂)

(X: halogen, alkyl or aryl)

(B₃)

Repeating structural units represented by the following chemical formulae 3 and 4 which are derived from aromatic diols:

Formula 3:

(C₁)

(C₂)

(C₃)

(X: halogen, alkyl or aryl)

(X: H, halogen or alkyl)

Formula 4:

It is preferable from the standpoint of the balance among heat resistance, mechanical properties and processability that the wholly aromatic liquid-crystal polymer contain at least 30 mole % of the unit ($A_1$) shown in the chemical formula 1. Preferable examples of the combination of repeating structural units constituting the wholly aromatic liquid-crystal polymer include the following combinations (a) to (f):

(a) combination of units ($A_1$), ($B_1$) and ($C_1$) and that of units ($A_1$), ($B_1$), ($B_2$) and ($C_1$), (b) combination of units ($A_1$) and ($A_2$)

(c) combinations (a) wherein part of the unit ($A_1$) is replaced by unit ($A_2$), (d) combinations (a) wherein part of the unit ($B_1$) is replaced by unit ($B_3$), (e) combinations (a) wherein part of the unit ($C_1$) is replaced by unit ($C_3$), and (f) combination (b) which is further combined with units ($B_1$) and ($C_1$).

Liquid-crystal polyesters of the combination (a) or (b) which are fundamental wholly aromatic liquid-crystal polymers according to the present invention are described in, e.g., JP-B 47-47870(1972) and JP-B 63-3888(1988).

The semi-aromatic liquid-crystal polymer to be used in the present invention is a polymer which contains units of at least one aliphatic group and the balance of which is composed of units of at least one group selected from the group consisting of carbonyl, ester, sulfone, amide, ether, thio ether, imide and azo groups, and aromatic units. In particular, it is preferable that the semi-aromatic liquid-crystal polymer comprises ester units and aromatic units. Examples of the semi-aromatic liquid-crystal polymer include those prepared from aromatic components such as terephthalic acid and p-hydroxybenzoic acid and aliphatic components such as adipic acid, sebacic acid, ethylene glydol, 1,3-butanediol, neopentyl glycol and cyclohexanediol. Specific examples thereof include liquid-crystal polymers disclosed in JP-B 56-18016(1981).

The thermoplastic resin to be used in the present invention is not particularly limited, but may be any resin which has such thermoplasticity as to permit heat molding. In particular, thermoplastic resins called engineering plastics are preferable. Examples of thermoplastic engineering plastics include polyamide, polyacetal, polycarbonate, modified polyphenylene ether, polybutylene terephthalate, polyethylene terephthalate, ultrahigh-molecular-weight polyethylene, polyphenylene sulfide, polysulfone, polyarylate, polyether imide, polyether sulfone, polyether ketone, polyether ether ketone, thermoplastic polyamide imide, thermoplastic polylmide, polyaryl ether nitrile and polybenzimidazole.

The liquid-crystal polymer composition of the present invention is desirably a composition comprising 0.1 to 90% by weight of the component (A), 80 to 0.1% by weight of the component (B) and the balance of the component (C). More desirably, the composition comprises 1 to 90% by weight of the component (A), 80 to 1% by weight of the component (B) and the balance of the component (C). Most desirably the composition comprises 3 to 80% by weight of the component (A), 70 to 3% by weight of the component (B) and the balance of the component (C). When the proportion of the component (A) is less than 0.1% by weight, the mechanical properties will be little improved. On the other hand, the use of the component (A) in an amount exceeding 90% by weight will be unfavorably uneconomical.

The liquid-crystal polymer composition of the present invention may contain one or more conventional additives as far as the object of the present invention is attained, and examples of the additives include fibrous and needlelike reinforcements such as glass fiber, silica/alumina fiber, wollastonite, carbon fiber and potassium titanate whisker; inorganic fillers such as calcium carbonate, dolomite, talc, mica, clay and glass bead; a mold release agent such as fluororesin; coloring agents such as dye and pigment; antioxidant; heat stabilizer; ultraviolet absorber; antistatic agent and surfactant.

In the preparation of the liquid-crystal polymer composition of the present invention, means for blending raw material components is not particularly limited. For example, it is preferable to employ a process which comprises mixing a wholly aromatic liquid crystal polymer, a semi-aromatic liquid-crystal polymer, a thermoplastic resin and, if necessary, one or more optional components selected from among reinforcement such as glass fiber, inorganic filler, mold release agent, heat stabilizer and so forth by the use of a Henschel mixer, tumbler or the like, and melt-kneading the resulting mixture with an extruder. In this process, all of the components may be subjected at once to the above treatment, or alternatively a composition comprising a wholly aromatic liquid-crystal polymer and a semi-aromatic liquid-crystal polymer may be prepared by melt kneading before being subjected to the above treatment together with the other components.

In order for the liquid-crystal polymer composition comprising the components (A), (B) and (C) to exhibit more excellent performance, it is desirable to enhance the degree of molecular orientation of the components (A) and (B) under a high shear stress caused by injection molding or the like.

The liquid-crystal polymer composition of the present invention has excellent mechanical properties and is relatively inexpensive, thus being useful as an engineering plastic material.

DETAILED DESCRIPTION OF THE INVENTION

Examples of the present invention will now be described, though the present invention is not limited to them. In the Examples, by the term "flow temperature" is meant a temperature at which each polymer exhibits an apparent melt viscosity of 48000 P as determined by using a capillary-type rheometer having a nozzle having an inner diameter of 1 mm and a length of 10 mm and heating the polymer at a temperature rise rate of 4° C./min to extrude the melt of the polymer from the nozzle under a load of 100 kg/cm2.

Examples 1 to 8 and Comparative Examples 1 to 4

A polycarbonate resin (trade name "Calibre 300-10", a product of Sumitomo Dow Ltd.), a copolymer composed of p-hydroxybenzoic acid and 6-hydroxy-2-naphthoic acid (trade name: Vectra A950, a product of Polyplastics Co., Ltd., flow temperature: 261° C.) as a wholly aromatic liquid-crystal polymer, and a copolymer composed of p-hydroxybenzoic acid and polyethylene terephthalate (trade name: Rodlan LC-5000, a product of Unitika Ltd., flow temperature: 246° C.) as a semi-aromatic liquid-crystal polymer were each dried in a vacuum at 100° C. for 24 hours, and mixed together at ratios specified in Table 1. The mixtures thus prepared were each granulated on a laboratory-scale kneading extruder (trade name: CS-194A MAX MIXING EXTRUDER, mfd. by Custom Scientific Instrument) at 310° C. Thus, liquid-crystal polymer compositions were obtained as pellets.

Further, liquid-crystal polymer compositions not containing any semi-aromatic liquid-crystal polymer (Comparative Examples 1 and 3) and those not containing any wholly aromatic liquid-crystal polymer (Comparative Examples 2 and 4) were also prepared as pellets in a similar manner to that described above.

The pelletized compositions prepared above were each injection-molded into a test piece having a length of 50 mm, a width of 2.5 mm and a thickness of 1 mm on a laboratory-scale injection molding machine (trade name: CS-183 MMX MAX MOLDER, mfd. by Custom Scientific Instrument) at a cylinder temperature of 310° C. and a mold temperature of 100° C. The test pieces thus prepared were each pulled with Tensilon STM-T50BP (trade name, mfd. by Orientec Corp.) at a rate of 10 mm/min to determine the strength and modulus. The results are given in Table 1. Further, it is shown in FIGS. 1 to 4 that the liquid-crystal polymer composition of the present invention exhibits a tensile strength and a modulus in tension which are more excellent than those expected according to the additivity rule.

The liquid-crystal polymer composition of the present invention exhibits a tensile strength and a modulus in tension which are better than those of the liquid-crystal polymer compositions (of Comparative Examples 1 and 3) not containing any semi-aromatic liquid-crystal polymer and those of the liquid-crystal polymer compositions (of Comparative Examples 2 and 4) not containing any wholly aromatic liquid-crystal polymer.

Examples 9 to 15 and Comparative Examples 5 and 6

In the same manner as that of the Example 1 or the Comparative Example 2, pelletized liquid-crystal polymer compositions were prepared, molded and examined except that a copolymer composed of p-hydroxybenzoic acid and polyethylene terephthalate (trade name: Rodlan LC-3000, a product of Unitika Ltd., flow temperature: 182° C.) was used as the semi-aromatic liquid-crystal polymer. The results are given in the Table 1. Further, it is shown in FIGS. 5 to 8 that the liquid-crystal polymer composition of the present invention exhibits a tensile strength and a modulus in tension which are better than those expected according to the additivity rule.

The liquid-crystal polymer composition of the present invention exhibits a tensile strength and a modulus in tension which are better than those of the liquid-crystal polymer compositions (of Comparative Examples 1 and 3) not containing any semi-aromatic liquid-crystal polymer and those of the liquid-crystal polymer compositions (of Comparative Examples 5 and 6) not containing any wholly aromatic liquid-crystal polymer.

TABLE 1

| | Composition (% by wt.) | | | | Tensile strength | Modulus in tension |
|---|---|---|---|---|---|---|
| | thermoplastic resin: | wholly arom. liq. cryst. polymer: | semi-arom. liq. cryst. polymer | | | |
| | polycarbonate | Vectra A950 | LC-5000 | LC-3000 | (kg/cm²) | (kg/cm²) |
| Ex. 1 | 50 | 45 | 5 | — | 1380 | 38000 |
| Ex. 2 | 50 | 35 | 15 | — | 1340 | 41500 |
| Ex. 3 | 50 | 25 | 25 | — | 1020 | 36500 |
| Ex. 4 | 50 | 15 | 35 | — | 1340 | 43000 |
| Ex. 5 | 70 | 29.5 | 0.5 | — | 1150 | 34000 |
| Ex. 6 | 70 | 27 | 3 | — | 1250 | 37500 |
| Ex. 7 | 70 | 21 | 9 | — | 1110 | 28000 |
| Ex. 8 | 70 | 15 | 15 | — | 830 | 27500 |
| Ex. 9 | 50 | 45 | — | 5 | 1450 | 39500 |
| Ex. 10 | 50 | 35 | — | 15 | 970 | 27500 |
| Ex. 11 | 50 | 25 | — | 25 | 790 | 29000 |
| Ex. 12 | 70 | 29.5 | — | 0.5 | 1010 | 25500 |
| Ex. 13 | 70 | 27 | — | 3 | 1110 | 28500 |
| Ex. 14 | 70 | 21 | — | 9 | 930 | 28500 |
| Ex. 15 | 70 | 15 | — | 15 | 880 | 25000 |
| Comp. Ex. 1 | 50 | 50 | — | — | 330 | 19500 |
| Comp. Ex. 2 | 50 | — | 50 | — | 950 | 36000 |
| Comp. Ex. 3 | 70 | 30 | — | — | 720 | 18000 |
| Comp. Ex. 4 | 70 | — | 30 | — | 770 | 29000 |
| Comp. Ex. 5 | 50 | — | — | 50 | 870 | 39500 |
| Comp. Ex. 6 | 70 | — | — | 30 | 830 | 27000 |

Examples 16 to 20 and Comparative Examples 7 and 8

Figure 1:
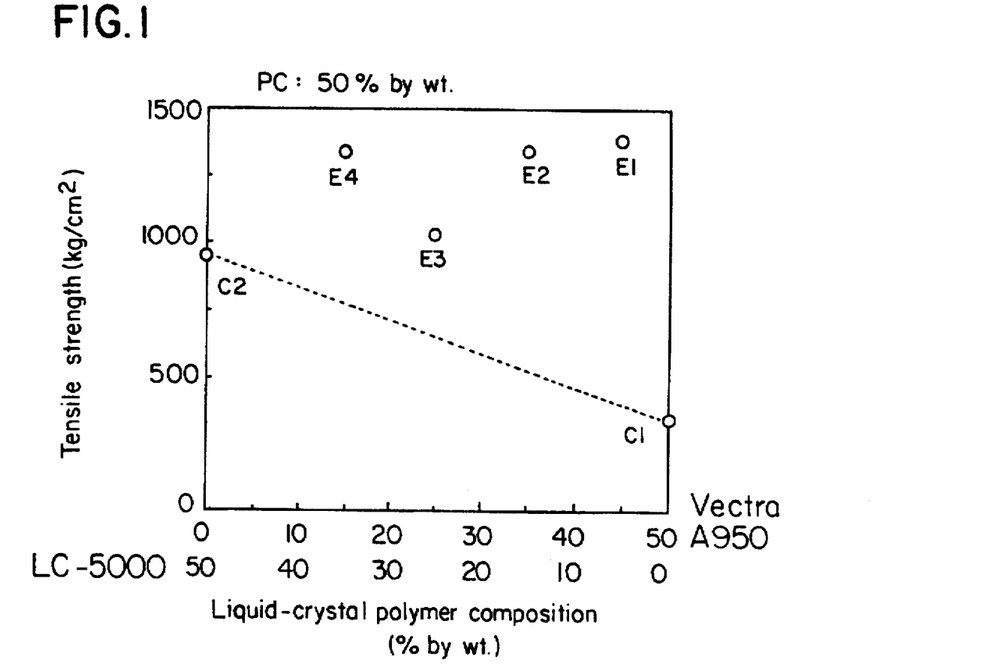
FIG. 1 is a graph showing the relationship between formulation and tensile strength with respect to the liquid-crystal polymer composition containing 50% by weight of a polycarbonate resin (hereinafter abbreviated to "PC") based on the results of Examples 1 to 4 and Comparative Examples i and 2 (in the FIG. E 1 and C 1 refer to Example 1 and Comparative Example 1, respectively, and the same applies hereinafter).
Figure 2:
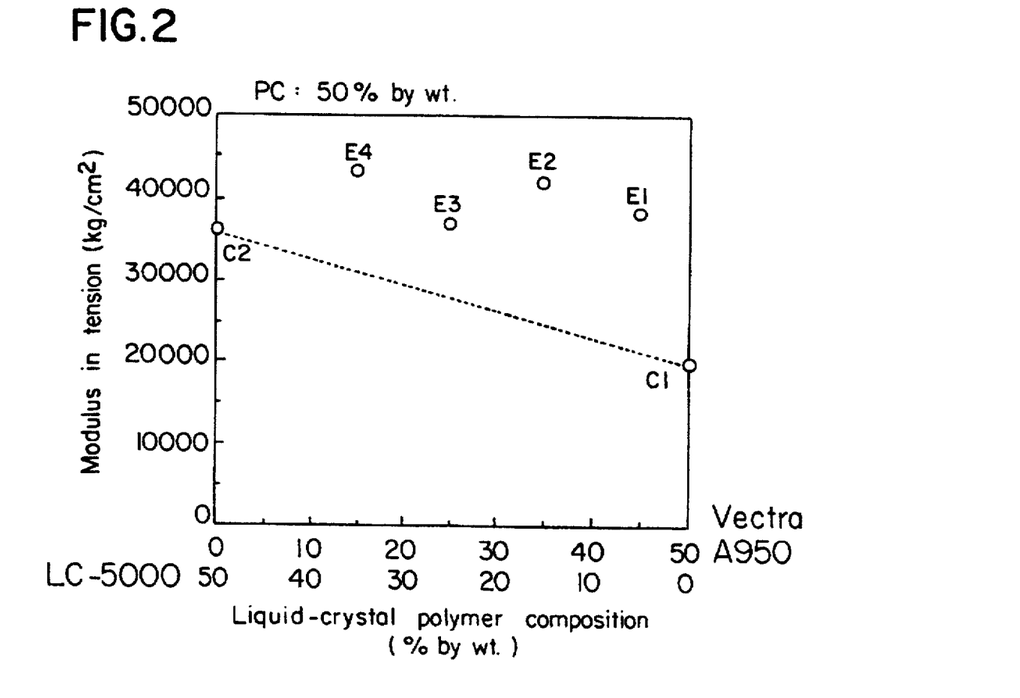
FIG. 2 is a graph showing the relationship between formulation and modulus in tension with respect to the liquid-crystal polymer composition containing 50% by weight of PC, based on the results of Examples 1 to 4 and Comparative Example 1 and 2.
Figure 3:
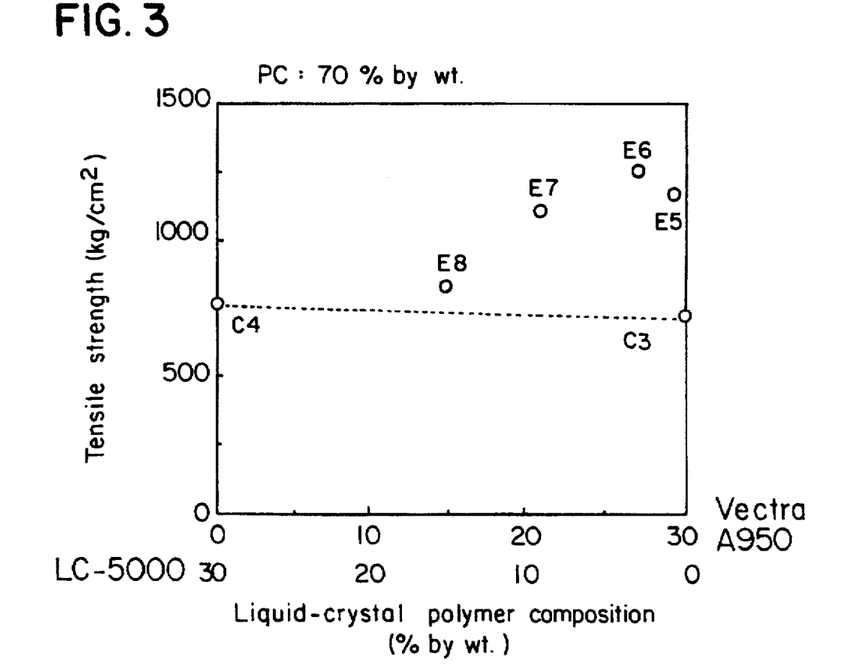
FIG. 3 is a graph showing the relationship between formulation and tensile strength with respect to the liquid-crystal polymer composition containing 70% by weight of PC, based on the results of Examples. 5 to 8 and Comparative Examples 3 and 4.
Figure 4:
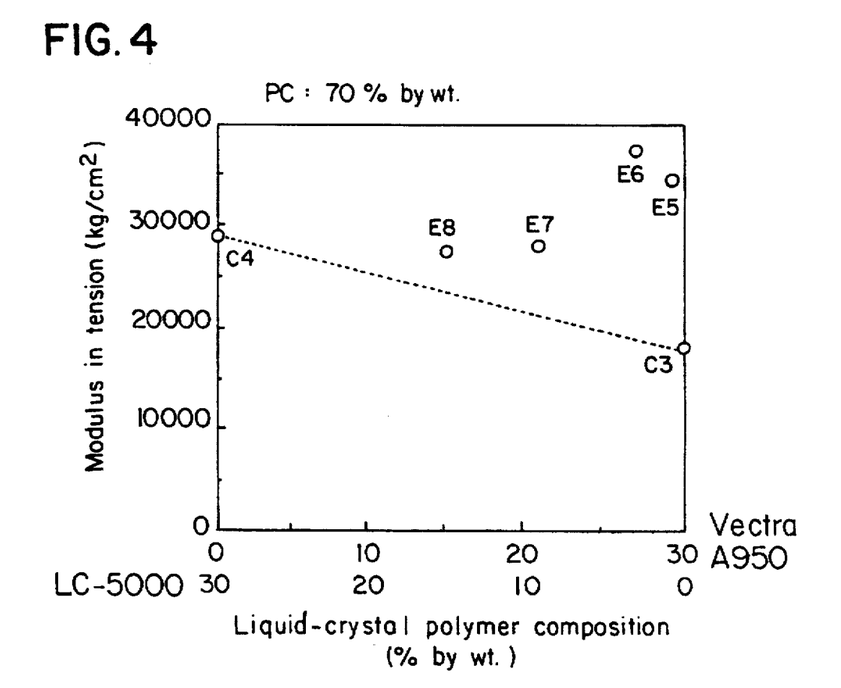
FIG. 4 is a graph showing the relationship between formulation and modulus in tension with respect to the liquid-crystal polymer composition containing 70% by weight of PC, based on the results of Examples 5 to 8 and Comparative Examples 3 and 4.
Figure 5:
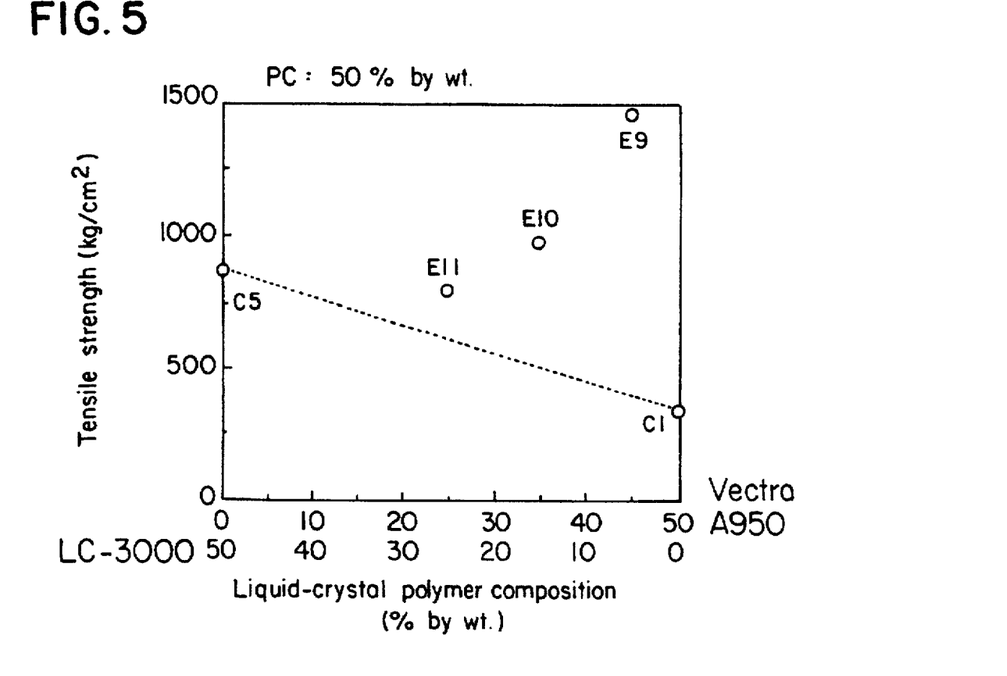
FIG. 5 is a graph showing the relationship between formulation and tensile strength with respect to the liquid-crystal polymer composition containing 50% by weight of PC, based on the results of Example 9 to 11 and Comparative Examples 1 and 5.
Figure 6:
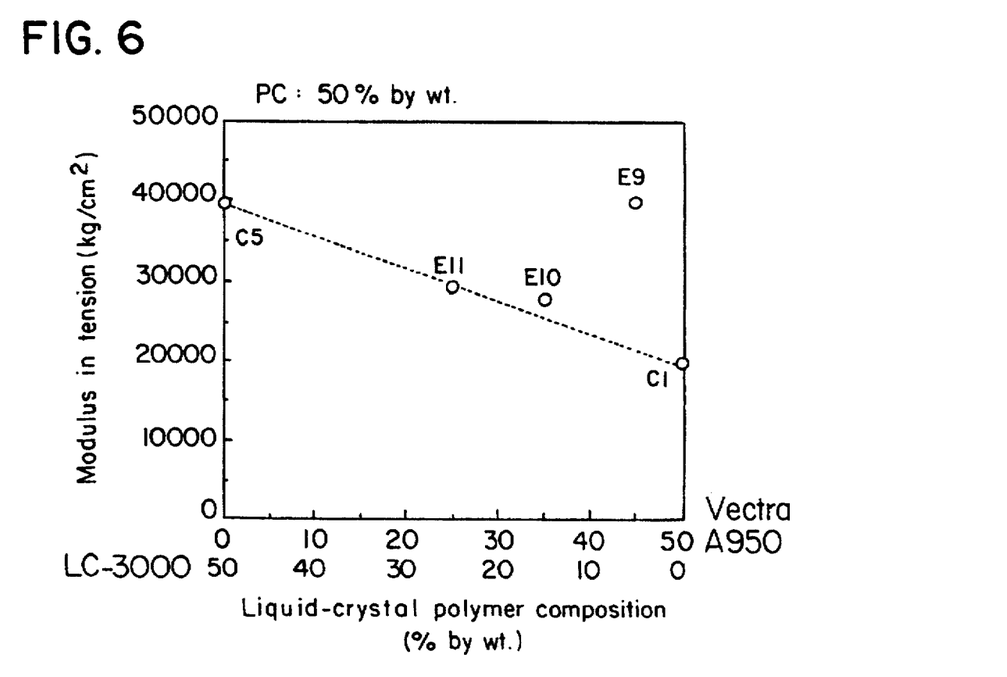
FIG. 6 is a graph showing the relationship between formulation and modulus in tension with respect to the liquid-crystal polymer composition containing 50% by weight of PC, based on the results of Examples 9 to 11 and Comparative Examples 1 and 5.
Figure 7:
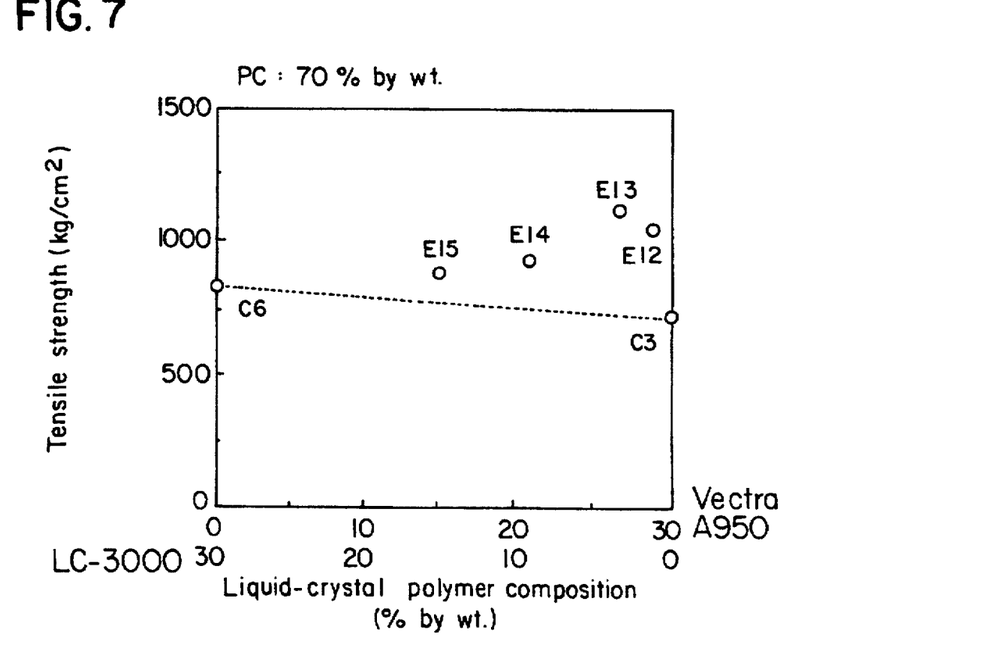
FIG. 7 is a graph showing the relationship between formulation and tensile strength with respect to the liquid-crystal polymer composition containing 70% by weight of PC, based on the results of Examples 12 to 15 and Comparative Examples 3 and 6.
Figure 8:
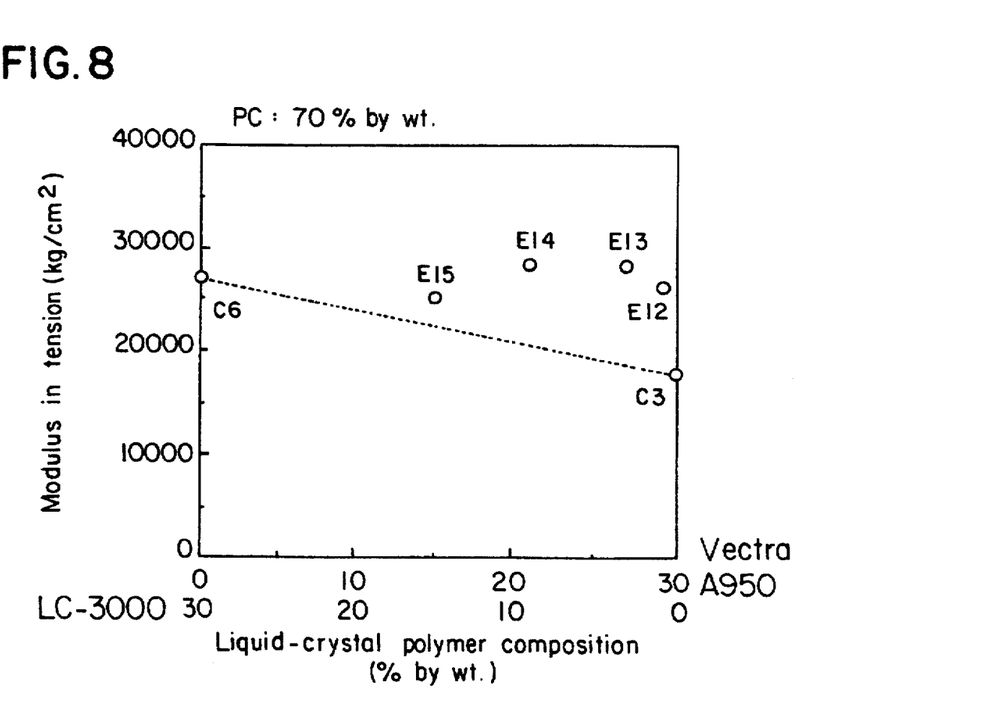
FIG. 8 is a graph showing the relationship between formulation and modulus in tension with respect to the liquid-crystal polymer composition containing 70% by weight of PC, based on the results of Examples 12 to 15 and Comparative Examples 3 and 6.
Figure 9:
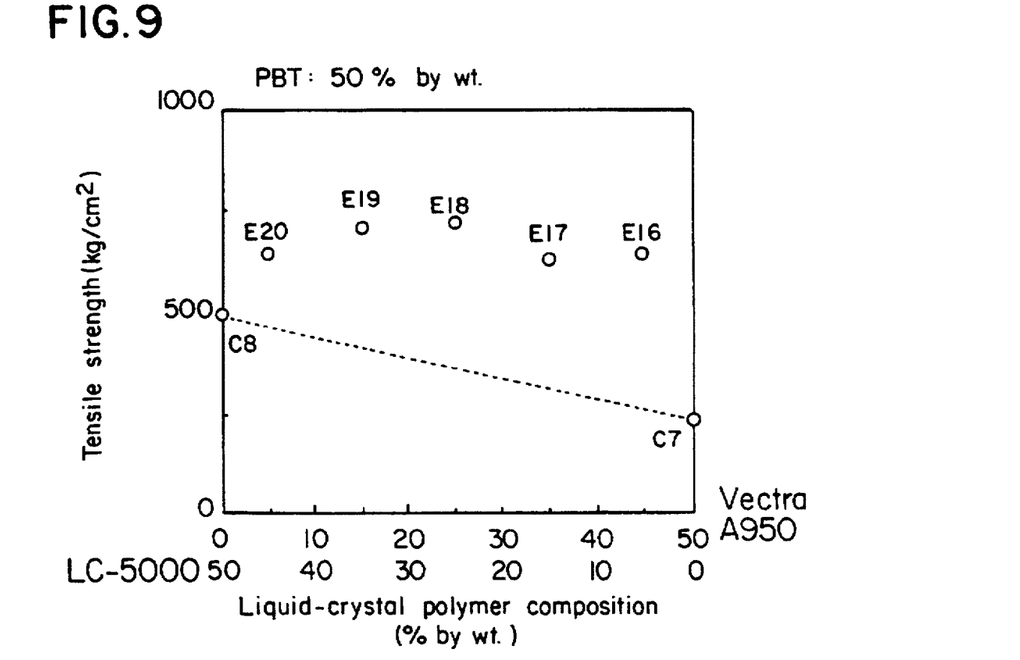
FIG. 9 is a graph showing the relationship between formulation and tensile strength with respect to the liquid-crystal polymer composition containing 50% by weight of a polybutylene terephthalate resin (hereinafter abbreviated to "PBT"), based on the results of Examples 16 to 20 and Comparative Examples 7 and 8.
Figure 10:
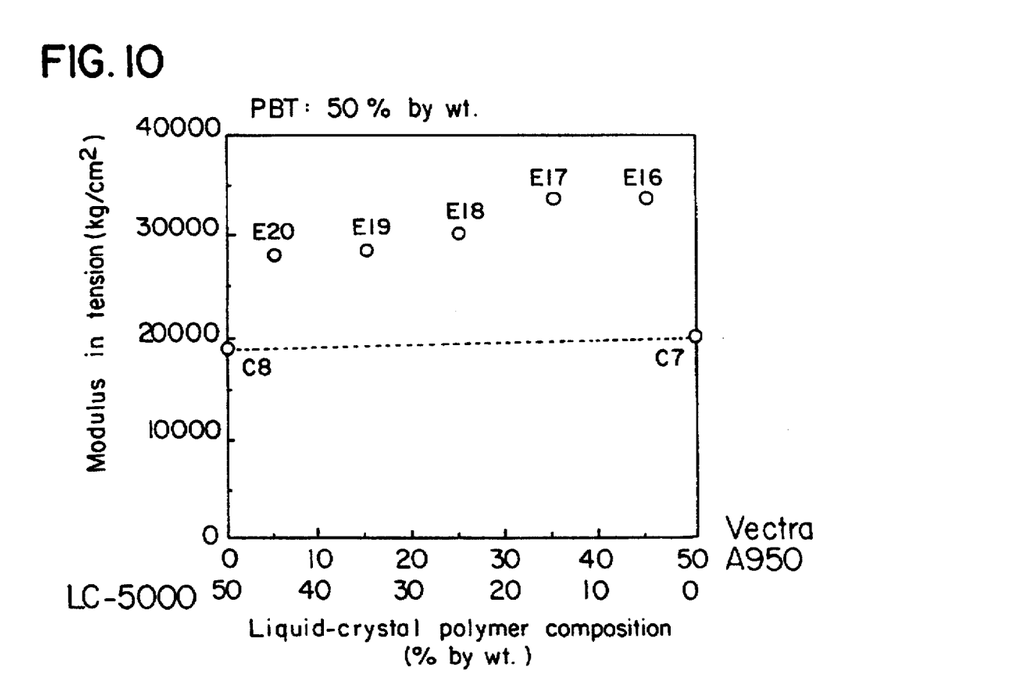
FIG. 10 is a graph showing the relationship between formulation and modulus in tension with respect to the liquid-crystal polymer composition containing 50% by weight of a polybutylene terephthalate resin (hereinafter abbreviated to "PBT"), based on the results of Examples 16 to 20 and Comparative Examples 7 and 8.

In the same manner as that of the Example 1 or the Comparative Example 2, pelletized liquid-crystal polymer compositions were prepared, molded and examined, except that a polybutylene terephthalate resin was used instead of the polycarbonate resin. The results are given in Table 2. Further, it is shown in FIGS. 9 and 10 that the liquid-crystal polymer composition of the present invention exhibits a tensile strength and a modulus in tension which are better than those expected according to the additivity rule.

The liquid-crystal polymer composition of the present invention exhibits a tensile strength and a modulus in tension which are better than those of the liquid-crystal polymer composition (of Comparative Example 7) not containing any semi-aromatic liquid-crystal polymer and those of the liquid-crystal polymer composition (of Comparative Example 8) not containing any wholly aromatic-liquid-crystal polymer.

Examples 21 to 25 and Comparative Example 9

Figure 11:
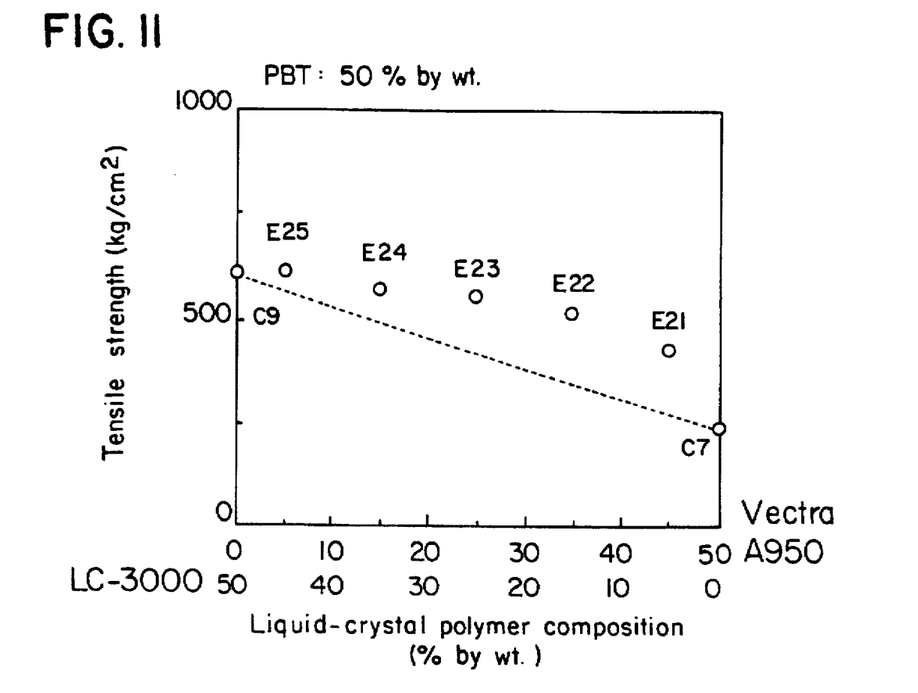
FIG. 11 is a graph showing the relationship between formulation and tensile strength with respect to the liquid-crystal polymer composition containing 50% by weight of PBT, based on the results of Examples 21 to 25 and Comparative Examples 7 and 9.
Figure 12:
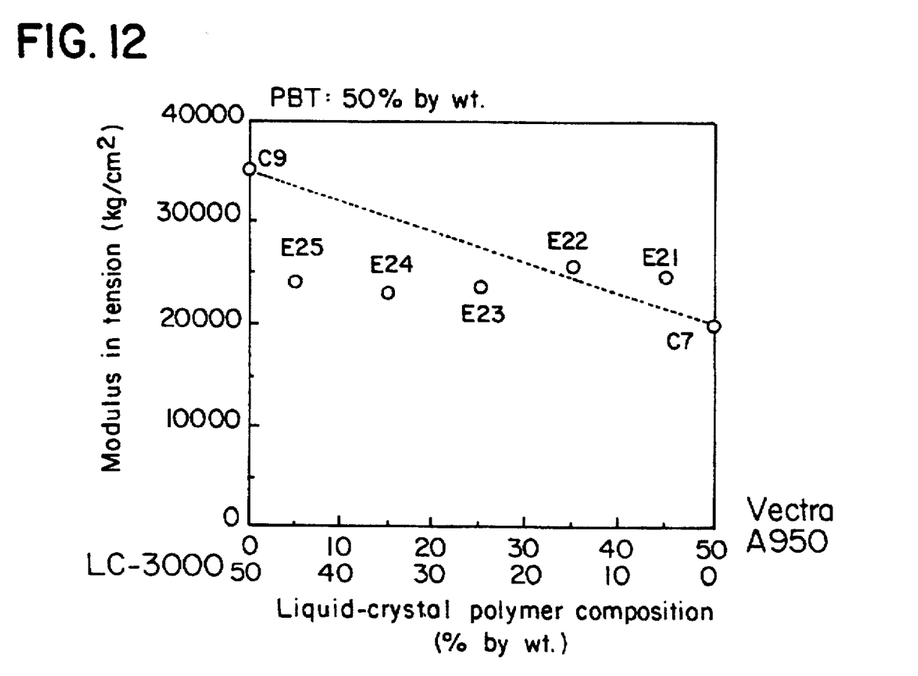
FIG. 12 is a graph showing the relationship between formulation and modulus in tension with respect to the liquid-crystal polymer composition containing 50% by weight of PBT, based on the results of Examples 21 to 25 and Comparative Examples 7 and 9.

In the same manner as that of the Example 9 or the Comparative Example 5, pelletized liquid-crystal polymer compositions were prepared, molded and examined, except that a polybutylene terephthalate resin was used instead of the polycarbonate resin. The results are given in the Table 2. Further, it is shown in FIGS. 11 and 12 that the liquid-crystal polymer composition of the present invention exhibits a tensile strength better than that expected according to the additivity rule.

The liquid-crystal polymer composition of the present invention exhibits a tensile strength better than that of the liquid-crystal polymer composition (of the Comparative Example 7) not containing any semi-aromatic liquid-crystal polymer. Further, it exhibits a tensile strength better than that excepted according to the additivity rule when compared with the liquid-crystal polymer composition (of Comparative Example 9) not containing any wholly aromatic liquid-crystal polymer.

TABLE 2

| | Composition (% by wt.) | | | | Tensile strength | Modulus in tension |
|---|---|---|---|---|---|---|
| | thermoplastic resin: polybutylene terephthalate | wholly arom. liq. cryst. polymer: Vectra A950 | semi-arom. liq. cryst. polymer | | | |
| | | | LC-5000 | LC-3000 | (kg/cm²) | (kg/cm²) |
| Ex. 16 | 50 | 45 | 5 | — | 680 | 33500 |
| Ex. 17 | 50 | 35 | 15 | — | 620 | 33500 |
| Ex. 18 | 50 | 25 | 25 | — | 710 | 30000 |
| Ex. 19 | 50 | 15 | 35 | — | 700 | 28500 |
| Ex. 20 | 50 | 5 | 45 | — | 640 | 28000 |
| Ex. 21 | 50 | 45 | — | 5 | 420 | 24500 |
| Ex. 22 | 50 | 35 | — | 15 | 510 | 25500 |
| Ex. 23 | 50 | 25 | — | 25 | 550 | 23500 |
| Ex. 24 | 50 | 15 | — | 35 | 570 | 23000 |
| Ex. 25 | 50 | 5 | — | 45 | 610 | 24000 |
| Comp. Ex. 7 | 50 | 50 | — | — | 230 | 20000 |

TABLE 2-continued

| | Composition (% by wt.) | | | | Tensile strength (kg/cm²) | Modulus in tension (kg/cm²) |
|---|---|---|---|---|---|---|
| | thermoplastic resin: polybutylene terephthalate | wholly arom. liq. cryst. polymer: Vectra A950 | semi-arom. liq. cryst. polymer | | | |
| | | | LC-5000 | LC-3000 | | |
| Comp. Ex. 8 | 50 | — | 50 | — | 490 | 19000 |
| Comp. Ex. 9 | 50 | — | — | 50 | 610 | 35000 |

Examples 26 to 36 and Comparative Examples 10 to 15

Figure 13:
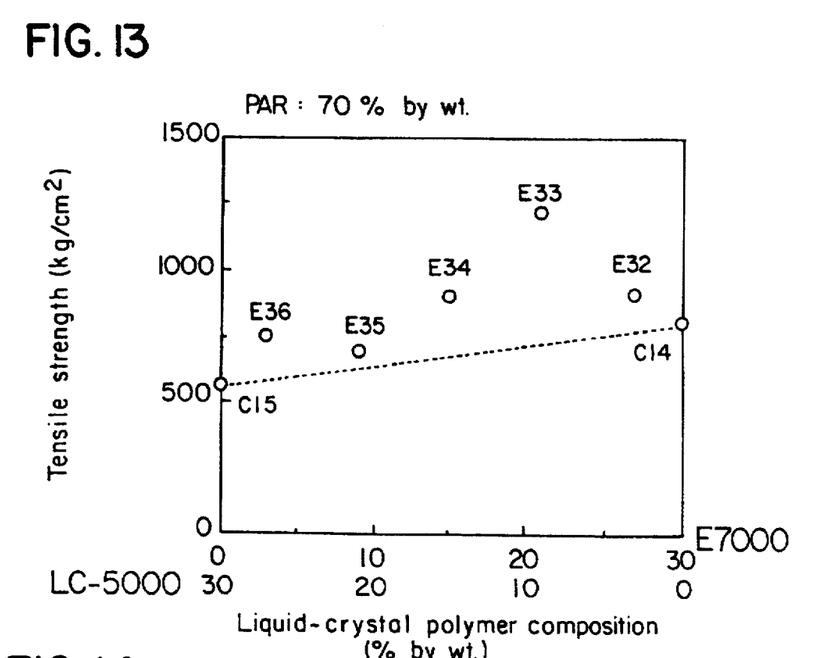
FIG. 13 is a graph showing the relationship between formulation and tensile strength with respect to the liquid-crystal polymer composition containing 70% by weight of polyarylate, based on the results of Examples 32 to 36 and Comparative Examples 14 and 15.
Figure 14:
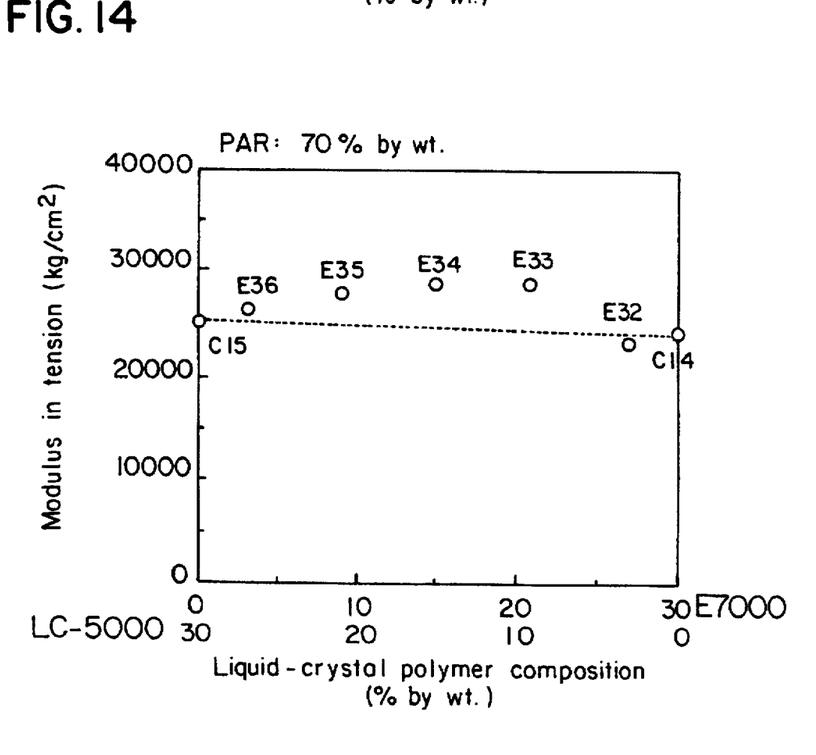
FIG. 14 is a graph showing the relationship between formulation and modulus in tension with respect to the liquid-crystal polymer composition containing 70% by weight of polyarylate, based on the results of Examples 32 to 36 and Comparative Examples 14 and 15.

In the same manner as that of the Example 1, pelletized liquid-crystal polymer compositions were prepared, molded and examined, except that a polyarylate resin (trade name: U-polymer U-100, a product of Unitika Ltd.) was used instead of the polycarbonate resin and that a copolymer composed of p-hydroxybenzoic acid, 4,4'-dihydroxybiphenyl, terephthalic acid and isophthalic acid (trade name: Sumika Super LCP E7000, a product of Sumitomo Chemical Co., Ltd., flow temperature: 287° C.) was used instead of the Vectra A950 (trade name, a product of Polyplastics Co., Ltd.). The results are given in Table 3. Further, it is shown in FIGS. 13 and 14 that the liquid-crystal polymer compositions of Examples 32 to 36 exhibit tensile strength values higher than those expected according to the additivity rule.

The liquid-crystal polymer composition of the present invention exhibits a tensile strength and a modulus in tension which are better than those of the liquid-crystal polymer compositions (of Comparative Examples 10, 12 and 14) not containing any semi-aromatic liquid-crystal polymer and those of the liquid-crystal polymer compositions (of Comparative Examples 11, 13 and 15) not containing any wholly aromatic liquid-crystal polymer.

least one aliphatic group and the balance of which is composed of units of at least one group selected from the group consisting of carbonyl, ester, sulfone, amide, ether, thio ether, imide and azo groups, and aromatic units, and (C) a thermoplastic resin other than liquid-crystal polymers, in which component (A) has repeating structural units based on the following formulas:

TABLE 3

| | Composition (% by wt.) | | | Tensile strength (kg/cm²) | Modulus in tension (kg/cm²) |
|---|---|---|---|---|---|
| | thermoplastic resin: polyarylate | wholly arom. liq. cryst. polymer: Sumika Super LCP E7000 | semi-arom. liq. cryst. polymer LC-5000 | | |
| Ex. 26 | 30 | 70 | 10 | 780 | 41000 |
| Ex. 27 | 30 | 70 | 30 | 760 | 60000 |
| Ex. 28 | 30 | 70 | 50 | 930 | 47000 |
| Ex. 29 | 50 | 50 | 10 | 790 | 32000 |
| Ex. 30 | 50 | 50 | 30 | 800 | 36000 |
| Ex. 31 | 50 | 50 | 50 | 800 | 39000 |
| Ex. 32 | 70 | 27 | 3 | 910 | 23000 |
| Ex. 33 | 70 | 21 | 9 | 1220 | 28500 |
| Ex. 34 | 70 | 15 | 15 | 900 | 28500 |
| Ex. 35 | 70 | 9 | 21 | 690 | 27500 |
| Ex. 36 | 70 | 3 | 27 | 750 | 26000 |
| Comp. Ex. 10 | 30 | 70 | — | 470 | 11000 |
| Comp. Ex. 11 | 30 | — | 70 | 900 | 33000 |
| Comp. Ex. 12 | 50 | 50 | — | 530 | 21000 |
| Comp. Ex. 13 | 50 | — | 50 | 650 | 32000 |
| Comp. Ex. 14 | 70 | 30 | — | 810 | 24000 |
| Comp. Ex. 15 | 70 | — | 30 | 560 | 25000 |

What is claimed is:

1. A liquid-crystal polymer composition which comprises (A) a wholly aromatic liquid-crystal polymer, (B) a semi-aromatic liquid-crystal polymer which contains units of at wherein X is halogen or alkyl, (A₂)

wherein X is halogen, alkyl or aryl,

(B₁)

(C₁)

(C₂)

(C₃)

-continued wherein X is halogen, alkyl or aryl, wherein X is hydrogen, halogen, or alkyl, (B₂)

(B₃)

and wherein component (A) has repeating structural units selected from one of the following groups:

(1) (A₁), (B₁), (B₂) and (C₁);
(2) (A₂), (B₁), (B₂) and (C₁);
(3) (A₁), (B₃), (B₂) and (C₁);
(4) (A₁), (B₁), (B₂) and (C₃); and
(5) (A₁), (A₂), (B₂), (B₂) and (C₁).

2. The composition as claimed in claim 1, in which component (A) has repeating structural units which include (A₁), (B₁), (B₂) and (C₁).

3. The composition as claimed in claim 1, in which component (A) has repeating structural units which include (A₂), (B₁), (B₂) and (C₁).

4. The composition as claimed in claim 1, in which component (A) has repeating structural units which include $(A_1)$, $(B_3)$, $(B_2)$ and $(C_1)$.

5. The composition as claimed in claim 1, in which component (A) has repeating structural units which include $(A_1)$, $(B_1)$, $(B_2)$ and $(C_3)$.

6. The composition as claimed in claim 1, in which component (A) has repeating structural units which include $(A_1)$, $(A_2)$, $(B_1)$, $(B_2)$ and $(C_1)$.

* * * * *